(12) United States Patent
Kasai et al.

(10) Patent No.: US 10,874,051 B2
(45) Date of Patent: Dec. 29, 2020

(54) UTILITY VEHICLE WITH NOISE INHIBITION

(71) Applicant: HONDA MOTOR CO., LTD., Tokyo (JP)

(72) Inventors: Koji Kasai, Wako (JP); Hideshi Sasaki, Wako (JP); Susumu Okubo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/317,295

(22) PCT Filed: Oct. 31, 2016

(86) PCT No.: PCT/JP2016/082343
§ 371 (c)(1),
(2) Date: Jan. 11, 2019

(87) PCT Pub. No.: WO2018/078879
PCT Pub. Date: May 3, 2018

(65) Prior Publication Data
US 2019/0289785 A1  Sep. 26, 2019

(51) Int. Cl.
*A01D 34/82* (2006.01)
*A01D 34/73* (2006.01)
(Continued)

(52) U.S. Cl.
CPC ............ *A01D 34/826* (2013.01); *A01D 34/73* (2013.01); *A01D 34/733* (2013.01);
(Continued)

(58) Field of Classification Search
CPC .. A01D 34/733; A01D 34/736; A01D 34/826; A01D 34/73
See application file for complete search history.

(56) References Cited

U.S. PATENT DOCUMENTS 2,471,367 A * 5/1949 Cavaness ............... A01D 34/63
56/11.8
4,114,354 A * 9/1978 Morris ............... A01D 34/6806
56/295
(Continued)

FOREIGN PATENT DOCUMENTS

EP  3075221 A1  10/2016
FR  2835393 A1  8/2003
(Continued)

OTHER PUBLICATIONS

International Search Report, issued in PCT/JP2016/092343, dated Jan. 24, 2017.

*Primary Examiner* — Alicia Torres
(74) *Attorney, Agent, or Firm* — Birch, Stewart, Kolasch & Birch LLP

(57) ABSTRACT

In a utility vehicle, equipped with a lawnmower work unit having a circular single blade disk rotatable around a rotating shaft connected to an output shaft of a work motor (prime mover) mounted on a chassis, and multiple (three) blades attached to a circumference of the blade disk at equally spaced apart positions, a single second disk is fixed to a middle of the surface of the blade disk of the lawnmower work unit at fixing positions that are spaced apart from each other.

7 Claims, 4 Drawing Sheets

(51) Int. Cl.
*A01D 34/00* (2006.01)
*A01D 34/78* (2006.01)
*A01D 101/00* (2006.01)

(52) U.S. Cl.
CPC ............ *A01D 34/008* (2013.01); *A01D 34/78* (2013.01); *A01D 2101/00* (2013.01)

(56) References Cited

U.S. PATENT DOCUMENTS

| | | | | |
|---|---|---|---|---|
| 4,161,096 | A * | 7/1979 | Biberger | A01D 34/826 56/12.9 |
| 4,407,112 | A * | 10/1983 | Shepherd | A01D 43/077 56/13.4 |
| 6,112,416 | A * | 9/2000 | Bridges | A01D 34/736 30/276 |
| 6,817,102 | B2 * | 11/2004 | Harris | A01D 34/736 30/276 |
| 10,433,480 | B2 * | 10/2019 | Schaedler | A01D 34/733 |
| 2016/0109241 | A1 | 4/2016 | Eguchi et al. | |
| 2016/0278289 | A1 | 9/2016 | Kasai et al. | |

FOREIGN PATENT DOCUMENTS

| | | | |
|---|---|---|---|
| JP | 42-8979 | 5/1967 | |
| JP | 58-16014 | 2/1983 | |
| JP | 63-25960 Y2 | 7/1988 | |
| JP | 9-28154 A | 2/1997 | |
| JP | 2004337047 A * | 12/2004 | ............ A01D 34/73 |
| JP | 3966834 B2 | 8/2007 | |
| JP | 2016-81434 A | 5/2016 | |
| JP | 2016-185091 A | 10/2016 | |
| WO | WO 2016/191636 A1 | 12/2016 | |

* cited by examiner

UTILITY VEHICLE WITH NOISE INHIBITION

TECHNICAL FIELD

This invention relates to a utility vehicle, particularly to structure of a lawn mower work unit mounted therein.

BACKGROUND ART

As a utility vehicle is known one that is equipped with a lawn mower work unit connected to an output shaft of a prime mover mounted on a chassis and that services a working area while running on drive wheels attached to the chassis. The technology set out in Patent Document 1 can be cited as an example.

The utility vehicle taught by Patent Document 1 is configured to comprise a lawn mower work unit equipped with a single circular blade disk rotatable around a rotating shaft connected to an output shaft of a prime mover mounted on a chassis and multiple blades attached to circumference of the blade disk at equally spaced apart positions.

PRIOR ART DOCUMENT

Patent Document

Patent Document 1: Japanese Unexamined Patent Publication No. 2016-81434A

SUMMARY OF THE INVENTION

Problem to be Solved by the Invention

In the utility vehicle of Patent Document 1, mowing width is determined by rotating radius of the blades, so that a problem of louder mowing noise due to blade disk vibration arises when rotating radius of the blade is increased in order to expand mowing width.

The object of this invention is therefore to overcome the aforesaid problem by providing a utility vehicle adapted to inhibit mowing noise even when rotating radius of the work unit blade is increased.

Means for Solving the Problem

In order to achieve the object, this invention provides a utility vehicle, equipped with a work unit having; a circular single blade disk rotatable around a rotating shaft connected to an output shaft of a prime mover mounted on a chassis; and multiple blades attached to circumference of the blade disk at equally spaced apart positions; characterized by: a single second disk fixed to middle of the surface of the blade disk of the work unit at positions that are spaced apart from each other.

Effects of the Invention

In this invention, the utility vehicle equipped with the work unit having the circular single blade disk rotatable around the rotating shaft connected to the output shaft of the prime mover mounted on the chassis and the multiple blades attached to circumference of the blade disk at equally spaced apart positions, is configured such that the single second disk is fixed to middle of the surface of the blade disk of the work unit at positions that are spaced apart from each other, whereby mowing noise can be inhibited.

More specifically, the fixing of the single second disk at the center of the blade disk to be spaced apart therefrom enhances rigidity of the blade disk and thereby reduces vibration of the blade disk. Namely, vibration of the blade disk is inhibited by the second disk, so that mowing noise is minimized.

MODE FOR CARRYING OUT THE INVENTION

Figure 1:
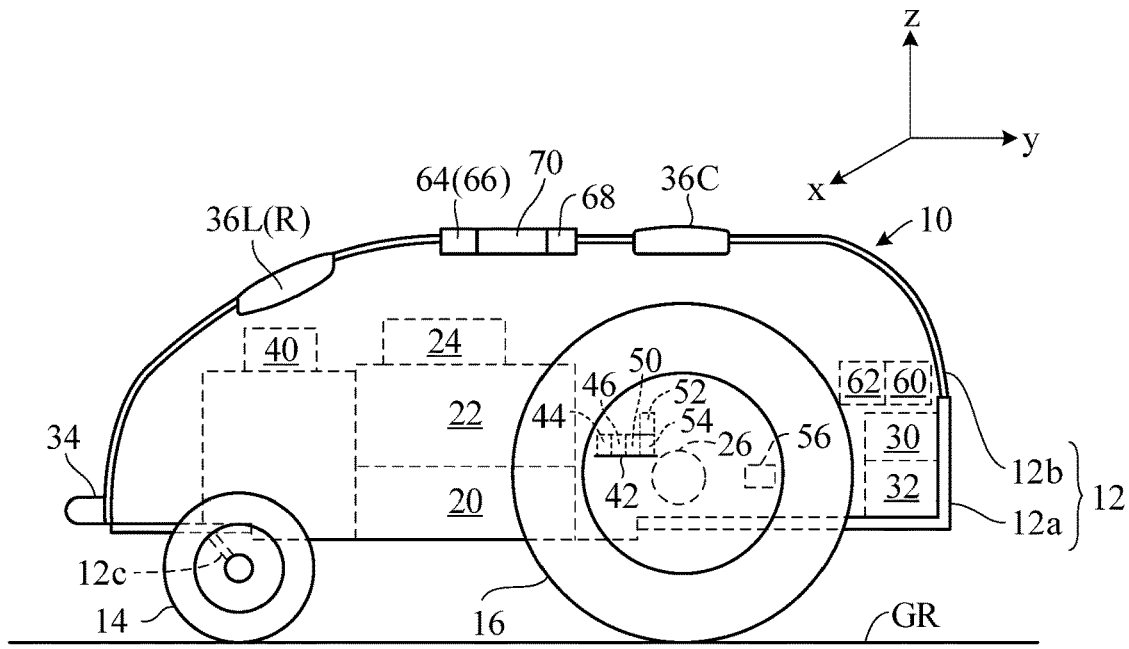
FIG. 1 is a conceptual diagram showing a utility vehicle in accordance with this invention.
Figure 2:
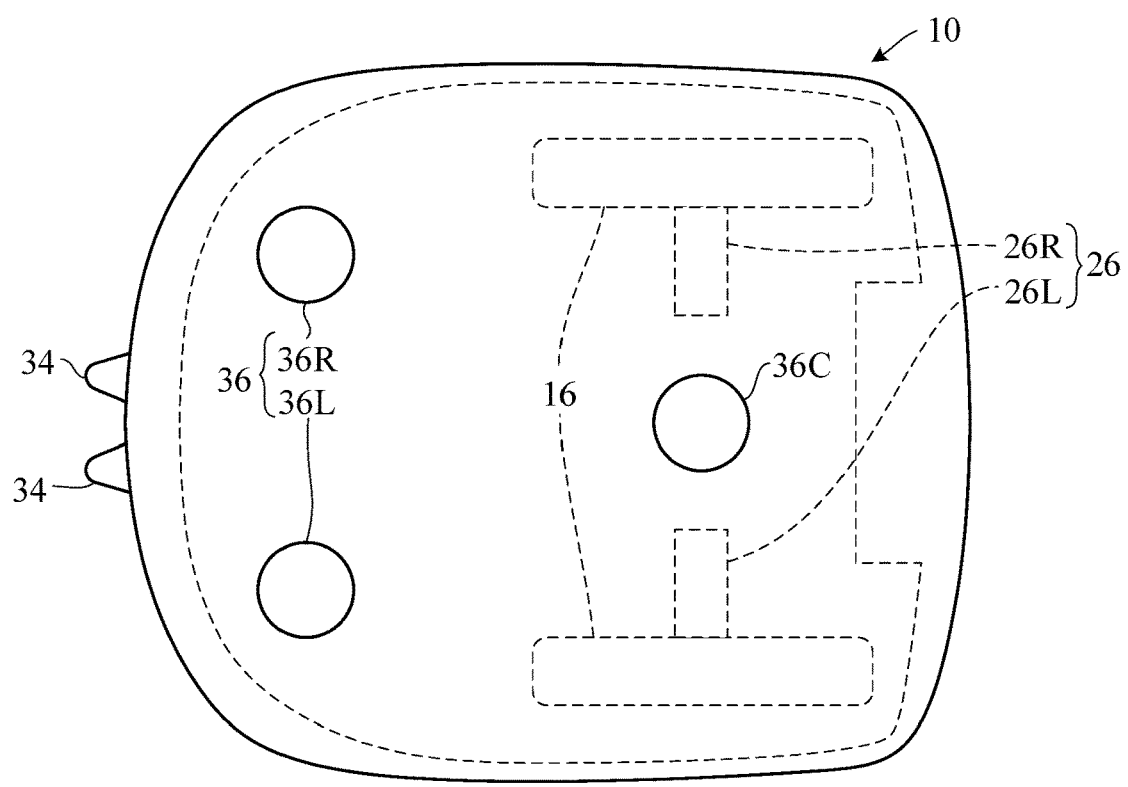
FIG. 2 is a top view of the utility vehicle of FIG. 1.
Figure 3:
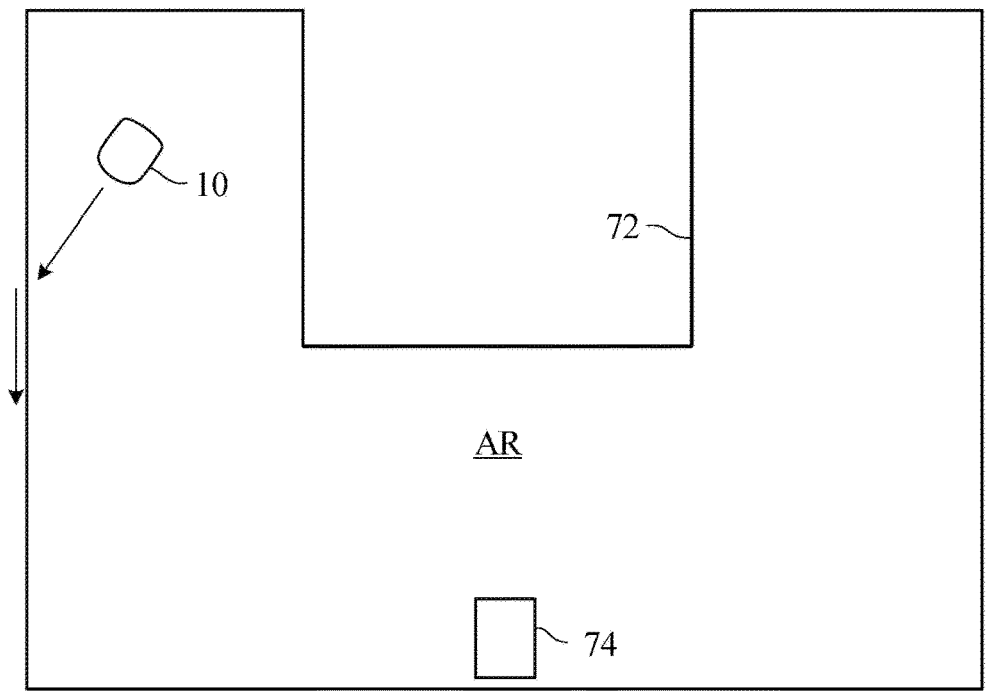
FIG. 3 is a plan view of a working area navigated by the utility vehicle of FIG. 1.

FIG. 1 is a conceptual diagram showing an overview of a utility vehicle in accordance with this invention; FIG. 2 is a top view of the utility vehicle of FIG. 1; and FIG. 3 is a plan view of a working area navigated by the utility vehicle of FIG. 1.

Reference number 10 appearing in FIG. 1 and other drawings designates a utility vehicle (hereinafter called "vehicle"). The vehicle 10 is actually implemented as a lawnmower. A body 12 of the vehicle 10 comprises a chassis (body frame) 12a and a cover 12b displaceably attached to the chassis.

The vehicle 10 is equipped with two front wheels 14 of relatively small diameter fixed by stays 12c to left and right sides of the chassis 12a toward its front end in the forward-rearward direction, and with left and right rear wheels 16 of relatively large diameter directly attached to the chassis 12a toward its rear end.

A lawnmower work unit (blade, specifically rotary blade) 20 is attached to near the middle part of the chassis 12a of the vehicle 10, and an electric motor (prime mover; hereinafter called "work motor") 22 is installed above the work unit 20. The work unit 20 is connected to the work motor 22 and is rotationally driven by the work motor 22.

A work unit height regulating mechanism 24 manually operable by a user is connected to the work unit 20. The work unit height regulating mechanism 24 is equipped with a handle and configured to enable the user to regulate vertical height of the work unit 20 from ground surface GR by manually turning the handle.

Two electric motors (prime movers; hereinafter called "propulsion motors") 26L and 26R are attached to the chassis 12a of the vehicle 10 rearward of the work unit 20. The propulsion motors 26L and 26R are connected to the left and right rear wheels 16 and, with the front wheels 14 operating as free wheels, the rear wheels 16, operating as driven wheels, are rotated independently on the left and right sides either normally (rotate to move forward) or reversely (rotate to move backward). The work unit 20, work motor 22, propulsion motors 26 and other components are covered by the cover 12b.

In this embodiment, the vehicle 10 is of such weight and size as to be portable by the user. For example, the vehicle 10 has a total length (forward-rearward direction length) of about 71 cm, total width of about 55 cm, and height of about 30 cm.

An onboard charging unit 30 and an onboard battery 32 connected thereto are housed at the rear of the utility vehicle 10, and two battery charging terminals 34 are attached to the chassis 12a so as to project forward from a front end position. The battery charging terminals 34 are connected to the onboard charging unit 30. The work motor 22 and propulsion motors 26 are also connected to and powered by the onboard battery 32.

Left and right magnetic sensors 36L and 36R are installed toward the front end of the body 12 of the vehicle 10 and a single magnetic sensor 36C is installed toward the rear end. The magnetic sensors 36 output signals indicating magnetic field strength.

A contact sensor 40 is attached to the body 12 to detect displacement between the chassis 12a and the cover 12b caused by contact of the vehicle 10 with an obstacle or foreign matter.

A housing box installed near the middle of the chassis 12a houses a printed circuit board 42 carrying an electronic control unit (hereinafter called "ECU") 44, which comprises a microcomputer equipped with a CPU, I/O, memory (ROM, EEPROM and RAM) and other components.

The printed circuit board 42 is provided thereon, in the vicinity of the ECU 44, with an angular velocity sensor 46 that generates an output indicating angular velocity (yaw rate) about a center-of-gravity z-axis (gravity axis) of the vehicle 10, an acceleration sensor 50 that generates an output indicating acceleration acting on the vehicle 10 in orthogonal three-axis (x, y and z) directions, a direction sensor 52 that generates an output indicating absolute orientation in response to terrestrial magnetism, and a GPS sensor 54 that receives radio waves from GPS satellites and generates an output indicting current position of the vehicle 10.

Wheel speed sensors 56 that generate outputs indicating wheel speeds of the left and right rear wheels 16 are installed near the left and right rear wheels 16 of the vehicle 10. A lift sensor 60 that detects upward lift (lift-up) of the cover 12b from the chassis 12a by the user, for example, is attached at a location between the chassis 12a and the cover 12b. A current sensor 62 that generates an output indicating consumption of onboard battery 32 current is installed on the onboard battery 32.

The utility vehicle 10 is equipped with a main switch 64 for instructing start of work operation and an emergency stop switch 66 for instructing emergency stop, both of which are operable by the operator. In addition, the top of the cover 12b has a large cutaway in which a keyboard, touch panel or other input device 68 is installed for input of instructions and the like by the user, and a display 70 is installed near the input device 68. The input device 68 and the display 70 are connected to the ECU 44, and the display 70 displays working mode and various other information in accordance with instructions from the ECU 44.

Outputs of the magnetic sensors 36, contact sensor 40, angular velocity sensor 46 and other sensors, and the outputs of the main switch 64 and other switches are sent to the ECU 44. Based on these outputs, the ECU 44 applies power from the onboard battery 32 to the propulsion motors 26 and outputs control values to control navigation of the vehicle 10 by controlling operation of the propulsion motors 26.

The ECU 44 detects (recognizes) a working area AR from the outputs of the magnetic sensors 36 and accordingly applies power to the work motor 22 so as to service the working area AR.

As shown in FIG. 3, the working area AR is delineated by a boundary wire (electrical wire) 72 laid around its periphery (boundary). A charging station 74 is installed in the working area AR for charging the onboard battery 32 of the vehicle 10. (In FIG. 3, sizes of the vehicle 10 and so on are exaggerated.)

As this invention is characterized by the structure of the work unit 20 of the vehicle 10 configured as described in the foregoing, this characterizing aspect is explained in the following.

Figure 4:
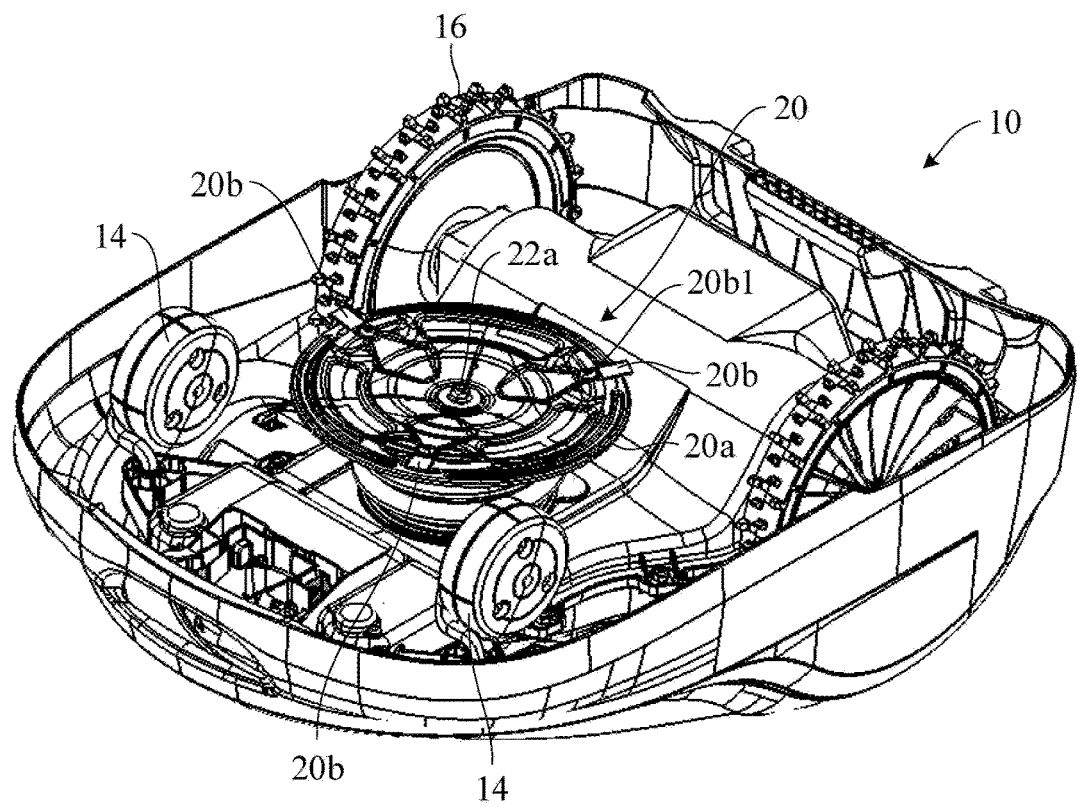
FIG. 4 is a perspective bottom view of an actual one of the utility vehicle shown schematically in FIG. 1.

FIG. 4 is a perspective bottom view of an actual one of the vehicle 10 shown schematically in FIG. 1.

As shown in FIG. 4, the work unit 20 comprises a single plan-view-circular blade disk 20a rotatable around a rotating shaft 22a connected to an output shaft of the work motor 22 and three (multiple) blades 20b attached to circumference of the blade disk 20a at 120° equispaced positions. The blades 20b are replaceably attached to circumferential edge region of the blade disk 20a by bolts-and-nuts 20b1.

Figure 5:
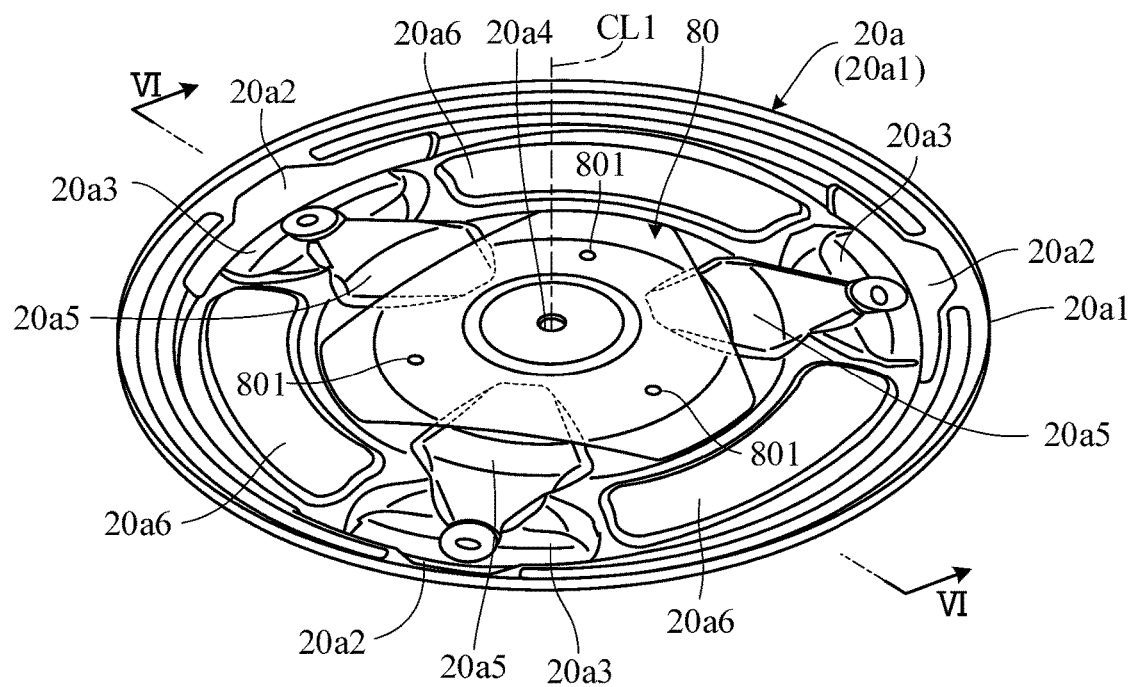
FIG. 5 is an enlarged view of an essential part of FIG. 4.
Figure 6:
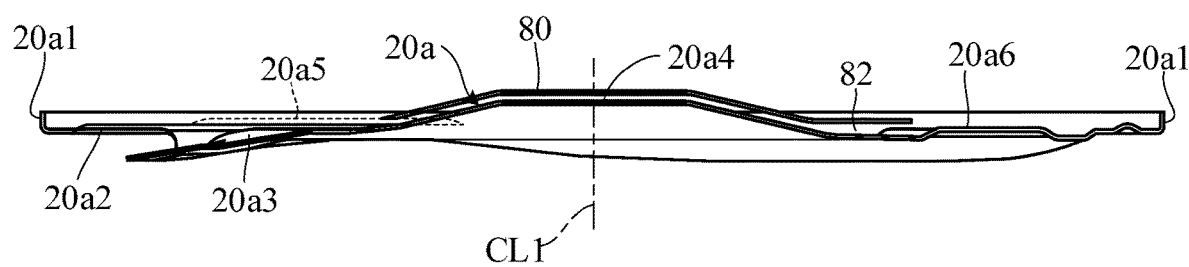
FIG. 6 is a cross-sectional diagram taken along VI-VI of FIG. 5.
Figure 7:
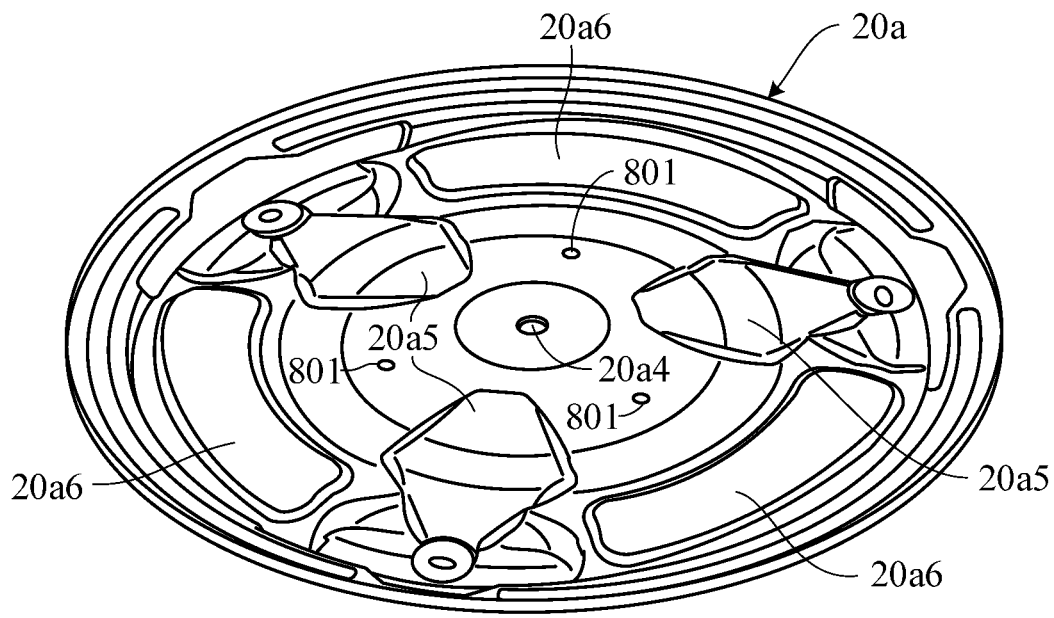
FIG. 7 is perspective view of the blade disk with a member removed from FIG. 5.
Figure 8:
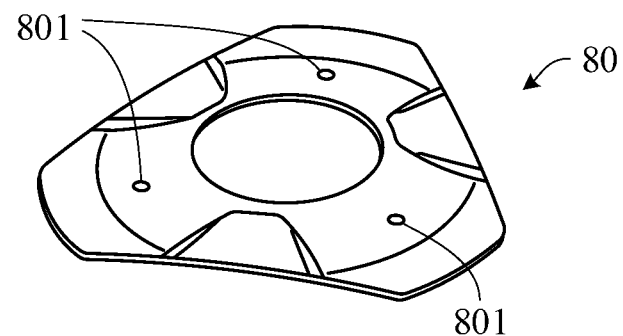
FIG. 8 is a perspective view of the member removed from FIG. 5.

FIG. 5 is an enlarged view of an essential part of FIG. 4; FIG. 6 is a cross-sectional diagram taken along VI-VI of FIG. 5; FIG. 7 is perspective view of the blade disk 20a with a member (second disk 80 discussed later) removed from FIG. 5; and FIG. 8 is a perspective view of said member. Illustration of the blades 20b is omitted in FIGS. 5 to 7.

As shown in FIGS. 5 and 6, a flange 20a1 is formed to rise upward (direction facing ground surface GR) fully around periphery of the blade disk 20a, and three circumferentially extending cutouts 20a2 are formed radially inward thereof at equal 120° intervals in circumferential direction.

Three slopes 20a3 are formed radially inward of the cutouts 20a2 at equal 120° intervals to incline radially inward away from the flange 20a1. Outer peripheral surfaces of the slopes 20a3 are formed like arcs centered on axis CL1 (axis of rotating shaft 22a)

A characterizing feature of the work unit 20 according to this embodiment is that, as shown FIG. 5, a single second disk 80 is fixed to middle of a surface of the blade disk 20a (back surface facing ground surface GR) at fixing positions 801 that are spaced apart from each other.

As shown in FIGS. 5 and 7, the second disk 80 exhibits approximately equilateral triangular shape in plan view, and the second disk 80 is fixed to the blade disk 20a by welding (e.g., spot welded or arc welded) or the like at 120° equispaced fixing positions corresponding to three vertices of the equilateral triangle, more exactly at 120° equispaced fixing positions 801 in the vicinity of the three vertices.

Therefore, as shown in FIG. 6, a structure is configured whereby spaces 82 in communication with the exterior are formed locally between the blade disk 20a and the second disk 80, more exactly at places other than at the three equispaced fixing positions 801 (illustration omitted in FIG. 6), i.e., between periphery of the second disk 80 and the blade disk 20a.

Moreover, as shown in FIGS. 6 and 7, multiple protrusions are formed on a surface of the blade disk 20a in addition to the aforesaid slopes 20a3. Namely, a surface of the blade disk 20a is formed around a center hole 20a4 centered on axis CL1 with three 120° equispaced first protrusions 20a5 of approximately diamond shape in plan view whose tips point toward the center hole 20a4.

In addition, the surface of the blade disk 20a is provided circumferentially between positions of the first protrusions 20a5 with three 120° equispaced second protrusions 20a6 formed in approximately rectangular shape in plan view to extend in circumferential direction, whereby a structure that enhances rigidity of the blade disk 20a by means of the first protrusions 20a5 and second protrusions 20a6 is configured.

As shown in FIGS. 5 and 6, the second disk 80 is fixed to the blade disk 20a so as to abut on at least one or the other of the first protrusions 20a5 and the second protrusions 20a6, particularly on the first protrusions 20a5.

Having been described in the embodiment, the utility vehicle 10 equipped with the work unit 20 having the circular single blade disk 20a rotatable around the rotating shaft 22a connected to the output shaft of the work motor (prime mover) 22 mounted on the chassis 12a and the multiple (3) blades 20b attached to circumference of the blade disk 20a at equally spaced apart positions, is configured such that the single second disk 80 is fixed to middle of the surface of the blade disk 20a of the work unit 20 at positions that are spaced apart from each other, whereby mowing noise can be inhibited.

More specifically, the fixing of the single second disk 80 at the center of the blade disk 20a to be spaced apart therefrom enhances rigidity of the blade disk 20a and thereby reduces vibration of the blade disk 20a (work unit 20). Namely, vibration of the blade disk 20a is inhibited by the second disk 80, so that mowing noise is minimized.

Moreover, a configuration is adopted wherein the second disk 80 is fixed to the blade disk 20a at equispaced fixing positions 801 that exhibit approximately equilateral triangular shape on the second disk 80 in plan view and correspond to vertices of the triangular shape, so that the spaces 82 in communication with the exterior are formed locally between the blade disk 20a and the second disk 80, and since these spaces can be exploited to reduce high frequency noise, mowing noise can be inhibited still more effectively.

In addition, a configuration is adopted wherein multiple protrusions (first protrusions 20a5 and second protrusions 20a6) are formed on the surface of the blade disk 20a, and the second disk 80 is fixed to the blade disk 20a so as to abut on at least one or the other of the sets of protrusions, e.g., on the first protrusions 20a5, and particularly on the first protrusions 20a5, so that rigidity of the blade disk 20a is further enhanced and mowing noise can therefore be still more effectively inhibited.

In the aforesaid embodiment, the second disk 80 is abutted on all of the three first protrusions 20a5, but it can instead be abutted on only one of the three, and optionally also be abutted on all or some of the second protrusions 20a6.

In the aforesaid embodiment, the second disk 80 is fixed to the blade disk 20a at fixing positions 801 by welding, but the fixing is not limited to this and can instead be by bolts, screws or other fastening devices or by caulking or the like.

In the aforesaid embodiment, the number of first protrusions 20a5 and second protrusions 20a6 is three of each but can instead be two or four or more of each.

Although in the foregoing the vehicle 10 is exemplified as an autonomously navigating vehicle that runs autonomously while detecting magnetic field of the boundary wire 72 laid around the working area AR, the vehicle 10 is not limited to this type of vehicle and can be of any type insofar as it is a utility vehicle.

DESCRIPTION OF SYMBOLS 10 utility vehicle (vehicle), 12 body, 12a chassis, 12b cover, 14 front wheels, 16 rear wheels, 20 lawnmower work unit, 20a blade disk (disk), 20a1 flange, 20a2 cutout, 20a3 slope, 20a4 center hole, 20a5 first protrusion, 20a6 second protrusion, 20b blade, 20b1 bolt-and-nut, 22 electric motor (work motor), 22a rotating shaft, 24 work unit height regulating mechanism, 26 electric motor (propulsion motor), 30 onboard charging unit, 32 onboard battery, 34 battery charging terminals, 36 magnetic sensors, 40 contact sensor, 44 electronic control unit (ECU), 46 angular velocity sensor, 50 acceleration sensor, 52 direction sensor, 54 GPS sensor, 56 wheel speed sensor, 60 lift sensor, 62 current sensor, 68 input device, 70 display, 72 boundary wire, 74 charging station, AR working area

The invention claimed is:

1. A utility vehicle, equipped with a work unit comprising:
a circular single blade disk rotatable around a rotating shaft connected to an output shaft of a prime mover mounted on a chassis, the circular single blade disk having a circumferential edge;
multiple blades attached to the blade disk at equally spaced apart first fixing positions, the first fixing positions spaced inwardly from the circumferential edge of the circular single blade disk; and
a single second disk fixed to a middle of the surface of the blade disk of the work unit at second fixing positions that are spaced apart from each other, the second fixing positions spaced from the first fixing positions in a circumferential direction of the circular single blade disk,
wherein spaces are formed between the blade disk and a peripheral edge of the second disk when the second disk is fixed to the blade disk by the blade disk being spaced from the peripheral edge of the second disk.

2. The vehicle according to claim 1, wherein the second disk is fixed to the blade disk at the second fixing positions that exhibit approximately an equilateral triangular shape on the second disk when viewed from above and correspond to vertices of the triangular shape.

3. The vehicle according to claim 1, wherein multiple protrusions are formed on the surface of the blade disk, and the second disk is fixed to the blade disk to abut on at least one of the protrusions.

4. The vehicle according to claim 1, wherein the blades are blades for a lawnmower.

5. A utility vehicle, equipped with a work unit comprising:
a circular single blade disk rotatable around a rotating shaft connected to an output shaft of a prime mover mounted on a chassis, the circular single blade disk having a circumferential edge;
multiple blades attached to the blade disk at equally spaced apart first fixing positions, the first fixing positions spaced inwardly from the circumferential edge of the circular single blade disk; and
a single second disk fixed to a middle of the surface of the blade disk of the work unit at second fixing positions that are spaced apart from each other, the second fixing positions spaced from the first fixing positions in a circumferential direction of the circular single blade disk,
wherein edges of the single second disk are spaced radially inwardly from the first fixing positions.

6. A utility vehicle, equipped with a work unit having:
a circular single blade disk rotatable around a rotating shaft connected to an output shaft of a prime mover mounted on a chassis, the circular single blade disk having a circumferential edge, a first surface and a second surface;

a rotatable shaft configured to extend from the first surface of the blade disk;

multiple blades attached to the blade disk at equally spaced apart first fixing positions, the first fixing positions spaced inwardly from the circumferential edge of the circular single blade disk; and a single second disk fixed to a middle of the surface of the blade disk of the work unit and attached to the second surface of the blade disk, wherein each of the first fixing positions is located between an edge of the single second disk and the circumferential edge of the circular single blade disk, wherein the second disk is a triangle fixed to the blade disc at second fixing positions, and wherein there are three first fixing positions and three second fixing positions.

7. The vehicle according to claim 6, wherein edges of the single second disk are spaced radially inwardly from the first fixing positions.

\* \* \* \* \*